United States Patent
Morikawa et al.

(10) Patent No.: US 7,515,395 B2
(45) Date of Patent: Apr. 7, 2009

(54) MATERIAL OF CASE FOR STORAGE CELL

(75) Inventors: Koichi Morikawa, Kyoto (JP); Masashige Ashizaki, Osaka (JP); Eri Hirose, Kyoto (JP); Yutaka Kobayashi, Kanagawa (JP)

(73) Assignees: Panasonic Corporation, Osaka (JP); Nippon Yakin Kogyo Co., Ltd., Tokyo (JP)

( * ) Notice: Subject to any disclaimer, the term of this patent is extended or adjusted under 35 U.S.C. 154(b) by 404 days.

(21) Appl. No.: 10/577,342

(22) PCT Filed: Dec. 15, 2004

(86) PCT No.: PCT/JP2004/019144

§ 371 (c)(1),
(2), (4) Date: Apr. 28, 2006

(87) PCT Pub. No.: WO2005/064028

PCT Pub. Date: Jul. 14, 2005

(65) Prior Publication Data

US 2007/0065717 A1 Mar. 22, 2007

(30) Foreign Application Priority Data

Dec. 26, 2003 (JP) ............................. 2003-432492

(51) Int. Cl.
*H01G 2/10* (2006.01)
*H01G 9/08* (2006.01)

(52) U.S. Cl. ...................... 361/517; 361/535

(58) Field of Classification Search ................ 361/517, 361/535
See application file for complete search history.

(56) References Cited

U.S. PATENT DOCUMENTS

| | | | |
|---|---|---|---|
| 5,478,670 | A | 12/1995 | Hayasaka et al. |
| 5,830,408 | A | 11/1998 | Azuma et al. |
| 5,942,184 | A | 8/1999 | Azuma et al. |
| 6,440,579 | B1 | 8/2002 | Hauser et al. |
| 6,918,967 | B2 | 7/2005 | Crum et al. |
| 2002/0098367 | A1 | 7/2002 | Mori et al. |
| 2002/0189399 | A1 | 12/2002 | Grubb et al. |
| 2004/0121162 | A1 | 6/2004 | Yamaoka et al. |
| 2005/0016636 | A1 | 1/2005 | Kobayashi et al. |

FOREIGN PATENT DOCUMENTS

| | | |
|---|---|---|
| CN | 1255168 | 5/2000 |
| EP | 1186351 | 3/2002 |
| JP | 62-094908 | 5/1987 |
| JP | 62-062449 | 12/1987 |
| JP | 63-081914 | 4/1988 |
| JP | 02217439 A * | 8/1990 |
| JP | 03229838 A * | 10/1991 |
| JP | 9-022701 | 1/1997 |
| JP | 11-293412 | 10/1999 |
| JP | 2000-144342 | 5/2000 |
| JP | 2001-118546 | 4/2001 |
| JP | 2003-160839 | 6/2003 |
| JP | 2003-253400 | 9/2003 |
| WO | 01/68929 | 9/2001 |
| WO | 03/044237 | 5/2003 |

OTHER PUBLICATIONS

English Language Abstract of CN 1255168.
English Language Abstract of JP 9-022701.
English Language Abstract of JP 2001-118546.
English Language Abstract of JP 2000-144342.
English Language Abstract of JP 2003-253400.
English Language Abstract of JP 2003-160839.
English Language Abstract of JP 62-062449.
English Language Abstract of JP 62-094908.
English Language Abstract of JP 63-081914.
J.R. Davis ED.: "ASM Specialty Handbook—Stainless steels" 1996, ASM International, Ohio, USA, XP002435193, ISBN: 0-87170-503-6, p. 6.

* cited by examiner

*Primary Examiner*—Eric Thomas
(74) *Attorney, Agent, or Firm*—Greenblum & Bernstein, P.L.C.

(57) ABSTRACT

There is provided a casing material for a storage cell having sufficient corrosion resistance and strength even under a charging environment of a high voltage exceeding 2.8 V. This casing material for the storage cell comprises C: not more than 0.03 mass %, Si: 0.01-0.50 mass %, Mn: not more than 0.20 mass %, P: not more than 0.04 mass %, S: not more than 0.0010 mass %, Ni: 20.0-40.0 mass %, Cr: 20.0-30.0 mass %, Mo: 5.0-10.0 mass %, Al: 0.001-0.10 mass %, N: 0.10-0.50 mass %, Ca: not more than 0.001 mass %, Mg: 0.0001-0.0050 mass %, 0: not more than 0.005 mass %, provided that contents of Cr, Mo and N satisfy $Cr+3.3\times Mo+20\times N \geqq 43$, and the balance being substantially Fe and inevitable impurities, in which a content of CaO as an oxide inclusion in steel is not more than 20 mass %.

4 Claims, 1 Drawing Sheet

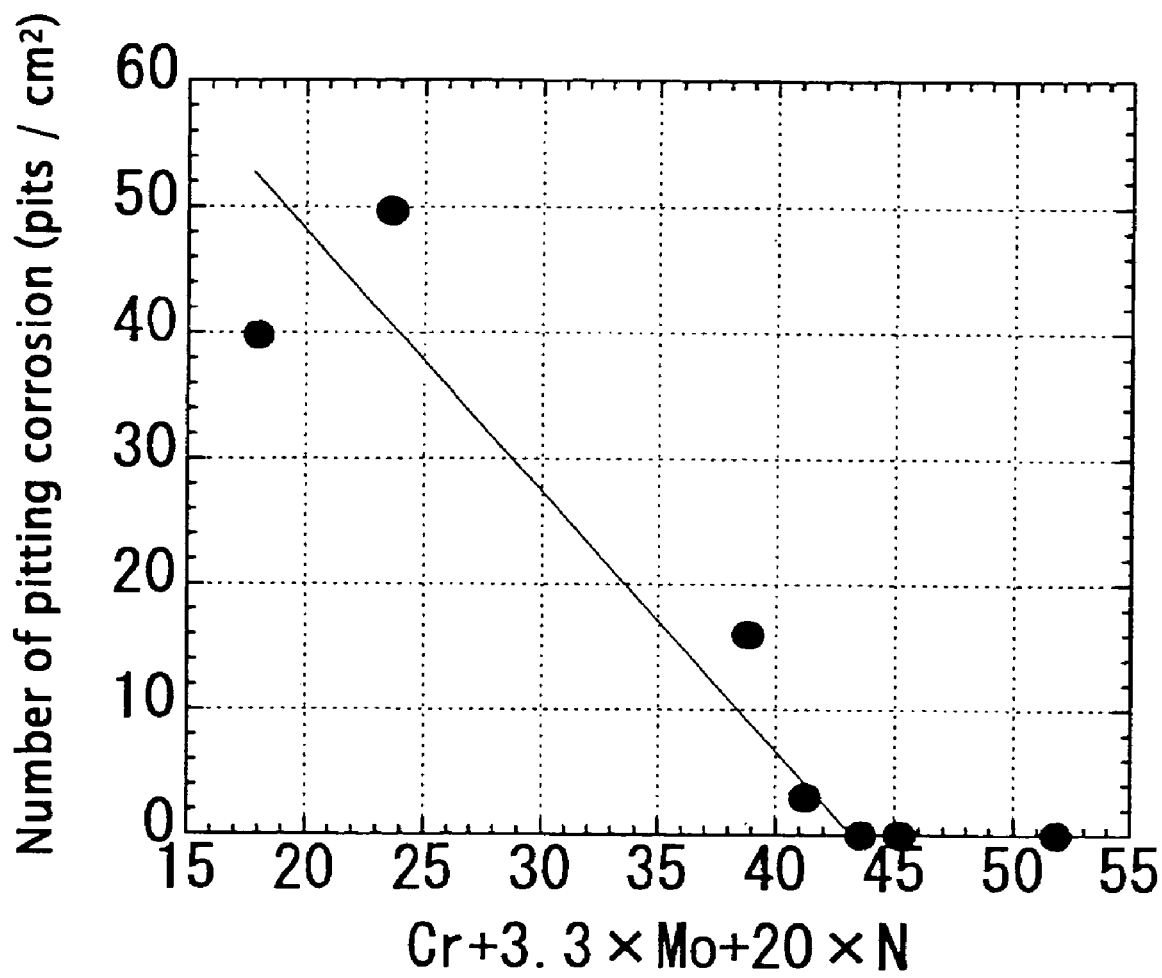

MATERIAL OF CASE FOR STORAGE CELL

RELATED APPLICATION

This application is an application claiming a priority right based on Japanese Patent Application of 2003-432492 filed on Dec. 26, 2003.

TECHNICAL FIELD

This invention relates to a casing member used in a coin-type storage cell such as small-size, large-capacity electric double-layer capacitor or the like and particularly proposes a casing member for a positive electrode having a high corrosion resistance and a high strength.

BACKGROUND ART

As a casing material of a positive electrode used in the coin-type storage cell such as electric double-layer capacitor is used mainly a metal in case of using a non-aqueous electrolyte, and a conductive synthetic resin in case of using an aqueous electrolyte. As the non-aqueous electrolyte is usually used an electrolyte obtained by dissolving a solute such as tetraethylammonium tetrafluoride borate or the like in a thermally stable, polar organic solvent such as propylene carbonate, acetonitrile or the like. When the electric double layer capacitor using such an electrolyte is charged, a casing for the positive electrode is exposed to an electrochemically oxidizable environment or an environment promoting an elution reaction of a metal. The casing for positive electrode exposed to such an environment has problems that the rise of internal impedance or remarkable elution reaction is accompanied with the oxide or hydroxide of the metal to cause pitting corrosion or whole corrosion to there by bring about the damage or the leakage of internal electrolyte.

Under the above environment, aluminum or stainless steel (JP-B-62-62449) or austenite-ferrite dual phase stainless steel having an aluminum layer in its interior (JP-A-62-94908) or the like has hitherto been used as a casing for positive electrode made of a metal. However, when the metal casing for positive electrode made of such a material is charged at a high voltage of about 2.8 V, there is a problem that the corrosion such as pitting corrosion or the like is easily caused and hence the electric double-layer capacitor having a high reliability can not be obtained.

As to such a problem, there have hitherto been proposed an alloy steel containing 0.1-2.0 mass % of N, a high corrosion-resistant austenite-ferrite dual phase stainless steel, a high corrosion-resistant austenitic stainless steel (see JP-A-63-81914) and the like as a raw material for the casing. However, these casing materials for positive electrode are insufficient in the corrosion resistance as a casing material for positive electrode being subjected to charging at 2.8 V. In the equipments using the electric double-layer capacitor, the performances have recently been enhanced, whereby the withstand voltage of the electric double-layer capacitor may exceeds 2.8 V. In this case, it has been confirmed that the excellent corrosion resistance is further required in the casing for positive electrode made of the stainless steel or the alloy steel.

DISCLOSURE OF THE INVENTION

The casing for positive electrode in the electric double-layer capacitor is required to have a strength for withstanding to an internal pressure. If the strength is lacking, there may be caused problems such as leakage of inner electrolyte and the like. In this point, the above-known materials such as aluminum, stainless steel (SUS304, SUS836L) and the like are required to make thicker because the strength is insufficient.

It is, therefore, an object of the invention to provide a casing material for positive electrode in an electric double-layer capacitor having sufficient corrosion resistance and strength even under a charging environment of a high voltage exceeding 2.8 V and capable of making a thickness thinner, i.e. a casing material for storage cell, particularly a casing material for coin type storage cell.

The inventors have made various studies for solving the aforementioned problems of the conventional techniques and found the following knowledge. That is, when the surface of the casing for positive electrode is rendered into an oxidizing atmosphere at a charging state in a non-aqueous electrolyte, inclusions in steel or oxide inclusion such as MnS, CaO and the like form a starting point of the corrosion and hence the corrosion resistance of the casing material for positive electrode is deteriorated as the existing ratio of the inclusions becomes high. Therefore, in order to improve the corrosion resistance of the casing material for positive electrode under the above atmosphere, it has been confirmed that it is effective to decrease Mn, S, Ca and O elements constituting the inclusion harmful for the corrosion resistance as far as possible, or to decrease the ratio of CaO included in the oxide inclusion to render the composition into $SiO_2$, $MgO$ or $Al_2O_3$ not exerting on the corrosion resistance. Further, it has been found that the material is rendered into the predetermined chemical composition and the following particular components satisfy the equation (1), which are required for improving the corrosion resistance:

$$Cr + 3.3 \times Mo + 20 \times N \geq 43 \qquad (1)$$

(wherein each content of Cr, Mo and N is represented as mass %).

Also, it has been found that in order to obtain a casing material having a strength sufficiently durable to an internal pressure of a storage cell, particularly a coin type storage cell such as an electric double-layer capacitor and excellent corrosion resistance and workability, a second cold rolling is carried out at a reduction of 15-25% after a first cold rolling and final annealing to obtain a re-rolled material having a higher Vickers hardness. Thus, the invention has been accomplished.

That is, the invention is a casing material for a storage cell being made of an austenitic stainless steel comprising C: not more than 0.03 mass %, Si: 0.01-0.50 mass %, Mn: not more than 0.20 mass %, P: not more than 0.04 mass %, S: not more than 0.0010 mass %, Ni: 20.0-40.0 mass %, Cr: 20.0-30.0 mass %, Mo: 5.0-10.0 mass %, Al: 0.001-0.10 mass %, N, 0.10-0.50 mass %, Ca: not more than 0.001 mass %, Mg: 0.0001-0.0050 mass %, O: not more than 0.005 mass %, provided that contents of Cr. Mo and N satisfy a relation of the following equation (1), and the balance being substantially Fe and inevitable impurities, in which a content of CaO as an oxide inclusion in steel is not more than 20 mass %:

$$Cr + 3.3 \times Mo + 20 \times N \geq 43 \qquad (1)$$

(wherein each content of Cr, Mo and N is represented as mass %).

In addition to the above components, the invention is effective to contain one or more elements of Cu: 0.01-1.00 mass %, W: 0.01-1.00 mass %, Co: 0.01-1.00 mass %, V: 0.01-1.00 mass %, Nb: 0.01-1.00 mass %, Ti: 0.01-1.00 mass % and B: 0.0001-0.0100 mass %.

According to the invention having the aforementioned construction, the total content of Cr, Mo and N is controlled while considering the interrelation of these elements and the contents of Mn and S are decreased as far as possible and further the ratio of CaO in the oxide inclusion in steel is controlled, whereby there can be provided a casing material having a sufficient corrosion resistance even under a charging environment of a high voltage exceeding 2.8 V in a storage cell, particularly a coin type storage cell or an electric double-layer capacitor and capable of making the thickness thinner owing to a high strength.

BRIEF DESCRIPTION OF THE DRAWINGS

FIG. 1 is a graph showing a relation between number of pitting corrosions observed on a surface of a test specimen after a voltage of 3.3 V is applied in an electric double-layer capacitor electrolyte at 60° C. for 24 hours and Cr+3.3×Mo+20×N.

BEST MODE FOR CARRYING OUT THE INVENTION

The casing material according to the invention has main features in points that (i) the element constituting MnS inclusion in steel and the composition of oxide inclusion are restricted, (ii) predetermined components and the range of adequate contents thereof are controlled, (iii) method of giving the strength, and the like. Tests based on the findings developing the invention are explained below.

Test 1

The inventors have examined the influence of MnS inclusion in stainless steel and the oxide inclusion exerting on the corrosion resistance at a charged state of the electric double-layer capacitor. In this test, the following material is used as a coin type casing material: that is, there are used austenitic stainless steels based on an austenitic stainless steel composed mainly of 23 mass % Cr-35 mass % Ni-7.5 mass % Mo-0.2 mass % N and having different contents of Mn and S in steel and weight ratios of oxide inclusions such as $SiO_2$, $Al_2O_3$, CaO, MgO and the like as shown in Table 1.

This stainless steel is obtained by applying a method described below. That is, a stainless steel having the above chemical composition is melted in an air melting furnace to form an ingot, and then the ingot is subjected to a heat treatment at 1250° C. for 8 hours, forged, cold rolled, heated at 1150° C. for 30 seconds and further subjected to a solution heat treatment through water cooling to obtain a cold rolled sheet having a thickness of 2 mm. Moreover, the composition of the oxide inclusions contained in each of the resulting cold rolled sheets is identified by means of an energy dispersion type X-ray spectroscopy device.

Then, an electrolyte is prepared by dissolving tetraethylammonium tetrafluoroborate in propylene carbonate. Next, this electrolyte is placed in a globe box purged with Ar, and the above cold rolled sheet as a positive electrode and a cold rolled sheet of SUS304 stainless steel as a negative electrode are inserted into the electrolyte, and thereafter a voltage of 3.3 V is applied between both the electrodes for 24 hours. In this case, the temperature of the electrolyte is kept at 60° C., and the cold rolled sheet of the positive electrode is subjected to wet polishing with SiC 800 polishing paper before the application of the voltage.

The presence or absence of corroded damage is examined by observing the surface of the positive electrode after the application of the voltage for 24 hours by means of a scanning type electron microscope, whereby the occurrence of corroded damage in form of pitting corrosion is evaluated as x and no occurrence of corrosion is evaluated as ○. The results are shown in Table 1. As shown in this table, it has been confirmed that when the contents of Mn and S are not more than 0.20 mass % and not more than 0.0010 mass %, respectively, or when CaO as the oxide inclusion included in steel is not more than 20 mass %, the test specimens do not generate the corroded damage even in the voltage application of 3.3 V for 24 hours and indicate a good corrosion resistance. Also, it has been confirmed that not more than 20 mass % of CaO does not exert on the corrosion resistance of the test specimen irrespectively of the weight ratio of $SiO_2$, $Al_2O_3$ and MgO contents in the oxide inclusion.

From the above test results, it is clear that when the high voltage is applied in the electrolyte, the corrosion resistance of the metal plate for positive electrode is largely dependent on the contents of Mn and S and the weight ratio of CaO in the oxide inclusion and hence the ranges thereof is required to be limited as mentioned above.

Moreover, the reason why the corrosion resistance is deteriorated as the contents of Mn and S increase is guessed due to the fact that as these components become large, non-metal inclusion (MnS) is produced to form a starting point of the corrosion. However, since MnS is very fine, it is difficult to determine the existence and existing ratio by means of a scanning type electron microscope. In the invention, therefore, it is handled to limit the contents of Mn and S instead of the determination of MnS ratio considering the proportional relation between the contents of Mn and S as mentioned above.

TABLE 1

| | Chemical composition (mass %) | | | | | | | | | | | | |
|---|---|---|---|---|---|---|---|---|---|---|---|---|---|
| No. | C | Si | Mn | P | S | Ni | Cr | Mo | Al | N | Ca | Mg | O |
| 1* | 0.007 | 0.05 | 0.10 | 0.012 | 0.0005 | 35.47 | 23.27 | 7.48 | 0.007 | 0.220 | 0.0002 | 0.0003 | 0.0028 |
| 2* | 0.019 | 0.08 | 0.18 | 0.013 | 0.0004 | 34.92 | 23.11 | 7.50 | 0.011 | 0.217 | 0.0004 | 0.0001 | 0.0015 |
| 3 | 0.011 | 0.07 | 0.26 | 0.011 | 0.0007 | 34.79 | 23.24 | 7.44 | 0.020 | 0.208 | 0.0003 | 0.0012 | 0.0032 |
| 4 | 0.016 | 0.07 | 0.14 | 0.015 | 0.0013 | 35.32 | 23.18 | 7.37 | 0.010 | 0.223 | 0.0002 | 0.0007 | 0.0020 |
| 5 | 0.009 | 0.05 | 0.35 | 0.013 | 0.0017 | 35.28 | 23.20 | 7.52 | 0.008 | 0.214 | 0.0005 | 0.0002 | 0.0018 |
| 6* | 0.007 | 0.09 | 0.11 | 0.011 | 0.0005 | 34.90 | 23.16 | 7.50 | 0.034 | 0.218 | 0.0008 | 0.0003 | 0.0025 |
| 7 | 0.014 | 0.10 | 0.12 | 0.014 | 0.0005 | 35.02 | 22.97 | 7.46 | 0.023 | 0.221 | 0.0014 | 0.0002 | 0.0022 |
| 8 | 0.011 | 0.08 | 0.08 | 0.014 | 0.0006 | 35.09 | 23.21 | 7.55 | 0.018 | 0.205 | 0.0022 | 0.0011 | 0.0019 |

| No. | Satisfy Mn: not more than 0.20 mass % S: not more than 0.0010 mass % | Mass % of CaO in oxide inclusion in steel | Other composition in oxide inclusion in steel | Result after application of 3.3 V voltage in an electrolyte of 60° C. for 24 hours |
|---|---|---|---|---|
| 1* | ○ | 0.1 | SiO$_2$, Al$_2$O$_3$, MgO | ○ |
| 2* | ○ | 0.6 | Al$_2$O$_3$, MgO | ○ |
| 3 | X | 1.4 | Al$_2$O$_3$, MgO | X (Occurrence of pitting corrosion) |
| 4 | X | 0.2 | Al$_2$O$_3$, MgO | X (Occurrence of pitting corrosion) |
| 5 | X | 1.1 | SiO$_2$, Al$_2$O$_3$, MgO | X (Occurrence of pitting corrosion) |
| 6* | ○ | 12.4 | Al$_2$O$_3$, MgO | ○ |
| 7 | ○ | 24.8 | Al$_2$O$_3$, MgO | X (Occurrence of pitting corrosion) |
| 8 | ○ | 43.9 | Al$_2$O$_3$, MgO | X (Occurrence of pitting corrosion) |

*shows the material of the invention.

Test 2

The inventors have tested the influence of components included in stainless steel (Cr, Mo, N) on the corrosion resistance at a charged state of the electric double-layer capacitor. In this test are used austenitic stainless steel and austenite-ferritic stainless steel having compositions shown in Table 2 in which CaO of the oxide inclusion in steel is controlled to not more than 20 mass %. These stainless steels are cold rolled sheets having a final thickness of 2 mm obtained by melting materials in an air melting furnace likewise Test 1. Moreover, the cold rolled sheet is subjected to a wet polishing with SiC 800 polishing paper before the voltage applying test as mentioned below.

Next, an electrolyte is prepared by dissolving tetraethylammonium tetrafluoroborate in propylene carbonate likewise Test 1, which is placed in a globe box purged with Ar. Into the electrolyte are inserted the above cold rolled sheet as a positive electrode and a cold rolled sheet of SUS304 stainless steel as a negative electrode, and thereafter a voltage of 3.3 V is applied between both the electrodes for 24 hours. In this case, the temperature of the electrolyte is kept at 60° C. After the application for 24 hours, the surface of the positive electrode is observed by means of a metal microscope to measure the presence or absence of corroded damage and the corrosion depth in case of causing the corrosion. The results are shown in FIG. 1.

| | Chemical composition (mass %) | | | | | | | | | | | | | |
|---|---|---|---|---|---|---|---|---|---|---|---|---|---|---|
| No. | C | Si | Mn | P | S | Ni | Cr | Mo | Cu | Al | N | Ca | Mg | O |
| 1 | 0.053 | 0.56 | 0.11 | 0.034 | 0.0009 | 8.29 | 18.12 | 0.19 | 0.30 | 0.007 | 0.050 | 0.0002 | 0.0003 | 0.0028 |
| 2 | 0.039 | 0.66 | 0.18 | 0.031 | 0.0010 | 10.79 | 16.84 | 2.13 | 0.16 | 0.011 | 0.030 | 0.0004 | 0.0001 | 0.0015 |
| 3 | 0.009 | 0.35 | 0.19 | 0.026 | 0.0007 | 6.67 | 24.73 | 3.32 | 0.11 | 0.020 | 0.160 | 0.0003 | 0.0012 | 0.0032 |
| 4 | 0.011 | 0.15 | 0.19 | 0.021 | 0.0005 | 22.51 | 21.37 | 5.13 | 0.02 | 0.010 | 0.145 | 0.0003 | 0.0008 | 0.0024 |
| 5* | 0.009 | 0.38 | 0.16 | 0.025 | 0.0005 | 17.73 | 20.01 | 6.07 | 0.78 | 0.010 | 0.148 | 0.0002 | 0.0007 | 0.0020 |
| 6* | 0.006 | 0.10 | 0.20 | 0.019 | 0.0006 | 24.19 | 23.00 | 5.54 | 0.09 | 0.008 | 0.193 | 0.0005 | 0.0002 | 0.0018 |
| 7* | 0.007 | 0.05 | 0.10 | 0.012 | 0.0005 | 35.47 | 23.27 | 7.48 | 0.02 | 0.007 | 0.220 | 0.0002 | 0.0003 | 0.0028 |

| No. | Cr + 3.3 × Mo + 20 × N (mass %) | Satisfy Mn: not more than 0.20 mass % and S: not more than 0.0010 mass % | Mass % of CaO in oxide inclusion in steel | Result after application of 3.3 V voltage in an electrolyte of 60° C. for 24 hours |
|---|---|---|---|---|
| 1 | 19.7 | ○ | 0.3 | X (Occurrence of pitting corrosion) |
| 2 | 24.5 | ○ | 3.7 | X (Occurrence of pitting corrosion) |
| 3 | 38.9 | ○ | 2.5 | X (Occurrence of pitting corrosion) |
| 4 | 41.2 | ○ | 1.8 | X (Occurrence of pitting corrosion) |
| 5* | 43.0 | ○ | 2.9 | ○ |
| 6* | 45.1 | ○ | 1.4 | ○ |
| 7* | 52.4 | ○ | 0 | ○ |

*shows the material of the invention.

In an abscissa of FIG. 1 is used {Cr+3.3×Mo+20×N} indicating so that Cr, Mo and N largely contributing to the corrosion resistance among the included components are made approximately equivalent in accordance with the contribution degree thereof. From FIG. 1, it has been confirmed that when the voltage of 3.3 V is applied to a positive electrode of stainless steel having Mn and S contents of not more than 0.20 mass % and not more than 0.0010 mass %, respectively, and controlling CaO in the oxide inclusion in steel to not more than 20 mass % but having a relation of Cr, Mo and N represented by the following equation:

$$Cr+3.3\times Mo+20\times N \qquad (1)$$

(wherein each content of Cr, Mo and N is represented as mass %) being less than 43, the corroded damage in the pitting form is caused and the corrosion resistance is insufficient. Therefore, it has been found that as a casing material for positive electrode in the electric double-layer capacitor used under an environment of charging at a high voltage of 3.3 V, at least Cr, Mo and N are required to be contents capable of maintaining a relation of $Cr+3.3\times Mo+20\times N \geq 43$.

Test 3

Further, the inventors have examined a method of increasing the strength within a range capable of working to a casing for positive electrode while maintaining the corrosion resistance in the austenitic stainless steels suitable for the casing material in the positive electrode of the electric double-layer capacitor confirmed in Tests 1 and 2. As previously mentioned, the austenitic stainless steel is low in the strength after the cold rolling and final annealing as compared with the austenite-ferritic stainless steel, so that the thickness is required to be make thicker when it is used as a casing material for positive electrode.

As a method of increasing the strength of the austenitic stainless steel, it is considered to lower the annealing temperature or to conduct a second light cold rolling (re-cold rolling) after the cold rolling and final annealing. Among them, however, the low-temperature annealing precipitates an intermetallic compound such as σ-phase or the like and fears the deterioration of the corrosion resistance, so that the inventors have examined the latter method (re-cold rolling).

That is, the austenitic stainless steel used in Test 2 and composed mainly of 23 mass % Cr-35 mass % Ni-7.5 mass % Mo-0.2 mass % N (Steel No. 6 in Table 2) is used in this test. The rolling reduction of the second cold rolling is changed within a range of 0-30% by changing the thickness before the second cold rolling and aligning the thickness after the second cold rolling to 0.15 mm.

As a result, it has been found that a hardness (not less than 280 HV as a Vickers hardness) equal to or more than that of SUS329J4L as a typical austenite-ferritic stainless steel is obtained at a rolling reduction in the second cold rolling of not less than 15% as shown in Table 3. On the other hand, it has been found that the pressing is possible till the rolling reduction at the second cold rolling is 25% as a result of a test that a casing for positive electrode in a coin type electric double-layer capacitor having a diameter of 6 mm is formed from the above sheets by pressing.

TABLE 3

| No. | Rolling reduction of second cold rolling | Vickers hardness | Result after application of 3.3 V voltage in an electrolyte of 60° C. for 24 hours | Result of pressing test on casing for positive electrode of coin type electric double-layer capacitor having a diameter of 6 mm |
|---|---|---|---|---|
| 1* | 0% | 213HV | ○ | ○ |
| 2* | 10% | 277HV | ○ | ○ |
| 3* | 15% | 308HV | ○ | ○ |
| 4* | 20% | 353HV | ○ | ○ |
| 5* | 25% | 367HV | ○ | ○ |
| 6 | 30% | 385HV | ○ | X (breakage by pressing) |

*shows the material of the invention, but if it is intended to increase the strength, only Nos. 3-5 are within the range of the invention.

Moreover, each of the sheets obtained by changing the rolling reduction of the second cold rolling is subjected to an application of a voltage of 3.3 V in the electrolyte of 60° C. for 24 hours likewise Tests 1 and 2. As a result, the corroded damage is not observed in all of the sheets.

As to the austenitic stainless steel suitable as the casing material for positive electrode in the electric double-layer capacitor, it has been confirmed from the above results that in order to increase the strength to an extent capable of working the casing material while maintaining the corrosion resistance, it is preferable to conduct the second cold rolling at a light rolling reduction of 15-25% after the first cold rolling and final annealing. Further, it has been confirmed that the re-rolled material obtained by the above treatment has a hardness equal to or more than that of the typical austenite-ferritic stainless steel SUS329J4L and is possible to decrease the thickness.

Moreover, the increase of the strength by such a method may be carried out, if necessary.

The reason on the limitation in the chemical composition of the austenitic stainless steel preferably used as the casing material according to the invention will be described below.

C: not more than 0.03 mass %

C is an element inducing a sensitization in the welding to lower the corrosion resistance, so that it is desirable to decrease the content. However, the extreme decreasing brings about the lowering of the strength but also increases the production cost. The C content can be allowed to 0.030 mass %, which is the upper limit.

Si: 0.01-0.50 mass %

Si is an element required for deoxidization, and is particularly an element necessary for decreasing the CaO ratio in the oxide inclusion in steel to constitute a main part of the oxide inclusion together with oxides of Al and Mg, so that not less than 0.01 mass % is added. However, the excess addition saturates the effect but also brings about the lowering of the ductility and further promotes the precipitation of an intermetallic compound such as σ-phase, χ-phase or the like to deteriorate the corrosion resistance, so that the upper limit is 0.50 mass %. It is desirably not more than 0.30 mass %, more desirably not more than 0.20 mass %.

Mn: not more than 0.20 mass %

Mn forms an inclusion in steel (MnS) with S, which is a starting point of corrosion to deteriorate the corrosion resistance as seen from the results of Test 1 in the non-aqueous electrolyte of the electric double-layer capacitor, so that it is an element necessary to reduce as far as possible in the invention. Also, it promotes the precipitation of the intermetallic compound such as σ-phase, χ-phase or the like deteriorating the corrosion resistance. Therefore, it is desirably not more than 0.20 mass %, more desirably not more than 0.15 mass %.

P: not more than 0.04 mass %

P is an element inevitably included as an impurity and easily segregates in a crystal boundary, so that it is desired to be less from a viewpoint of the corrosion resistance and hot workability. However, the extreme reduction of the P content brings about the increase of the production cost. The P content can be allowed to 0.04 mass %, which is the upper limit. Desirably, it is not more than 0.03 mass %.

S: not more than 0.0010 mass %

S forms an inclusion in steel (MnS) with Mn, which is a starting point of corrosion in the non-aqueous electrolyte of the electric double-layer capacitor to deteriorate the corrosion resistance. Furthermore, it easily segregates in the crystal boundary likewise P to deteriorate the hot workability, so that it is an element necessary to reduce as far as possible in the invention. As seen from the results of Test 1, when the S content exceeds 0.0010 mass %, the harmfulness is considerably developed, so that the content is not more than 0.0010 mass %. Desirably, it is not more than 0.0005 mass %.

Ni: 20.00-40.00 mass %

Ni is effective to suppress the precipitation of the intermetallic compound such as σ-phase, χ-phase or the like, and is an element necessary to render the texture into austenite, so that it is required to be at least 20.0 mass %. However, when it exceeds 40.0 mass %, the hot workability is deteriorated and the hot deformation resistance is increased to deteriorate the productivity, so that the upper limit is 40.0 mass %.

Moreover, the Ni content is preferable to be 24.00-37.00 mass %, more preferably 30.00-36.00 mass %.

Cr: 20.00-30.00 mass %

Cr is an element improving the corrosion resistance. In order to obtain such an effect, it is required to be not less than 20.00 mass %, but when it exceeds 30.00 mass %, the formation of the intermetallic compound such as σ-phase, χ-phase or the like is promoted and hence the corrosion resistance is deteriorated, so that the Cr content is 20.00-30.00 mass %.

Moreover, the Cr content is preferable to be not less than 22.00 mass %.

Mo: 5.00-10.00 mass %

Mo is an element effective for improving the corrosion resistance. In order to obtain such an effect, it is required to be not less than 5.00 mass %.

However, when it exceeds 10.00 mass %, the precipitation of the intermetallic compound is promoted and the corrosion resistance is inversely deteriorated, so that the range is 5.00-10.00 mass %. Moreover, the Mo content is preferable to be not less than 6.00 mass %, more preferably not less than 7.00 mass %.

Al: 0.001-0.100 mass %

Al is a strong deoxidization material, and must be positively added to decrease the CaO ratio in the oxide inclusion in steel and to constitute a main part of the oxide inclusion together with oxides of Si and Mg. When it is less than 0.001 mass %, the effect is not obtained, while when it exceeds 0.100 mass %, the effect is saturated and also the formation of a vast inclusion influencing on the appearance of the steel sheet and the corrosion resistance is promoted and further the precipitation of AlN as a compound with N becomes remarkable to reduce the effect of N effective for the corrosion resistance, so that the range is 0.001-0.100 mass %.

N: 0.10-0.50 mass %

N is a strong element forming austenite and is an element effective for improving the corrosion resistance likewise Cr and Mo and suppressing the precipitation of the intermetallic compound. In order to obtain such an effect, it is required to be not less than 0.10 mass %. However, when it exceeds 0.50 mass %, the hot deformation resistance is extremely raised to obstruct the hot workability, so that the range is 0.10-0.50 mass %. Moreover, the N content is preferable to be not less than 0.15 mass %, more preferably not less than 0.20 mass %.

Ca: not more than 0.001 mass %

Ca is inevitably included as CaO in the oxide inclusion in steel, which is a starting point of corrosion in the non-aqueous electrolyte of the electric double-layer capacitor to deteriorate the corrosion resistance, so that it is an element necessary to decrease as far as possible in the invention. As seen from the results of Test 1, when the Ca content exceeds 0.0010 mass %, the harmfulness is considerably developed, so that the content is not more than 0.0010 mass %. Desirably, it is not more than 0.0005 mass %.

Mg: 0.0001-0.0050 mass %

Mg is a deoxidization agent. However, when it is less than 0.0001 mass %, the effect is not developed, while when it exceeds 0.0050 mass %, the effect is saturated and the formation of a vast inclusion influencing on the appearance of the steel sheet and the corrosion resistance is promoted, so that the content is 0.0001-0.0050 mass %.

O: not more than 0.005 mass %

O forms an oxide inclusion in steel with Ca and is a starting point of corrosion in the non-aqueous electrolyte of the electric double-layer capacitor to deteriorate the corrosion resistance, so that it is an element necessary to decrease as far as possible. When the O content exceeds 0.005 mass %, the harmfulness is considerably developed, so that the content is not more than 0.005 mass %. Desirably, it is not more than 0.003 mass %.

Cu: 0.01-1.00 mass %
W: 0.01-1.00 mass %
Co: 0.01-1.00 mass %
V: 0.01-1.00 mass %
Nb: 0.01-1.00 mass %
Ti: 0.01-1.00 mass %

In the invention, one or more of Cu: 0.01-1.00 mass %, W: 0.01-1.00 mass %, Co: 0.01-1.00 mass %, V: 0.01-1.00 mass %, Nb: 0.01-1.00 mass % and Ti: 0.01-1.00 mass % may be included in addition to the above components.

These elements are general components effective for the improvement of the corrosion resistance. In order to obtain such an effect, it is required to include not less than 0.01 mass % of each of these components. On the other hand, when it exceeds 1.00 mass %, the precipitation of the intermetallic compound such as σ-phase, χ-phase or the like is promoted to deteriorate the corrosion resistance and obstruct the hot workability, so that the content of each of the components is 0.01-1.00 mass %.

B: 0.0001-0.0100 mass %

In the invention, B: 0.0001-0.0100 mass % may be included in addition to the above components. B is very effective to improve the hot workability. However, when it is less than 0.0001 mass %, the effect is less, while when it exceeds 0.0100 mass %, the hot workability is deteriorated. Therefore, the B content is 0.0001-0.0100 mass %.

Cr+3.3×Mo+20×N≧43

In the invention, Cr, Mo and N are added so as to satisfy the following relation:

$$Cr+3.3 \times Mo+20 \times N \geq 43 \qquad (1)$$

(wherein each content of Cr, Mo and N is represented as mass %). Because, as seen from the results of Test 2, when Cr+3.3×

Mo+20×N is less than 43, even if the weight ratio of CaO in the oxide inclusion in steel as a main constitutional factor of the invention is optimized, the sufficient corrosion resistance is not developed under such an environment that the electric double-layer capacitor is charged at a high voltage exceeding 2.8 V.

CaO content in oxide inclusion in steel: not more than 20 mass %

In the invention, CaO in the oxide inclusion in steel is limited to not more than 20 mass %. Because, as seen from the results of Test 1, if the above is not satisfied, the sufficient corrosion resistance is not developed under an environment of charging the electric double-layer capacitor at a high voltage. In the invention, all oxides inclusion in steel are not necessary to be $SiO_2$, $Al_2O_3$, CaO, MgO alone or a composite oxide thereof, and it is sufficient that not more than 20 mass % of CaO is simply existent in any of the oxide inclusions. Also, the other oxides may be existent alone or may form a composite oxide with the above oxide. As the other oxide are considered MnO, FeO, $TiO_2$ and the like.

Second Cold Rolling (Re-Cold Rolling)

As to the casing material of the invention, it is preferable that a re-rolled material having a hardness of not less than 280 HV as a Vickers hardness is formed by subjecting to a second cold rolling at a light reduction of 15-25% after the first cold rolling-final annealing, if necessary. In general, the thinning of the casing material is required to increase the strength of the material, but the strength after the cold rolling and final annealing is not particularly sufficient in the austenitic stainless steel. Therefore, it is seen from the results of Test 3 that the re-rolled material of austenitic stainless steel is formed by subjecting the second cold rolling at a light rolling reduction of 15-25% after the cold rolling and final annealing, whereby the strength equal to or more than that of SUS329J4L is provided while maintaining the corrosion resistance and workability. When the rolling reduction is less than 15%, the increase of the strength is insufficient, while when it exceeds 25%, the ductility is too lowered and hence the working as the casing material is impossible. Therefore, the rolling reduction of the second cold rolling after the first cold rolling-final annealing is limited to a range of 15-25%.

EXAMPLES

The invention is explained with reference to the examples.

There are prepared test specimens made of austenitic stainless steel having a chemical composition shown in Table 4 and a thickness of 0.15 mm by the same production methods of the above Tests 1-3 as a casing material of the invention and a comparative material. The composition of the oxide inclusion in steel is identified by an energy dispersion type X-ray spectroscopic analysis device. The test specimens are subjected to a bright heat treatment as a final annealing after a first cold rolling, a part of which is subjected to a first cold rolling up to a predetermined thickness and further to the bright heat treatment and then to a second cold rolling up to a thickness of 0.15 mm.

In these test specimens, a Vickers hardness is measured, and a pressing test on a casing for positive electrode of a coin type electric double-layer capacitor having a diameter of 6 mm is conducted, and further a coin type electric double-layer capacitor having a diameter of 6 mm is assembled and kept at 60° C. under a humidity of 95 mass %, and then a voltage of 3.3 V is applied to both electrodes for 500 hours to evaluate the presence or absence of corroded damage on the surface of the casing for positive electrode.

Moreover, the electric double-layer capacitor is constructed with an organic electrolyte obtained by dissolving a predetermined concentration of an electrolyte corresponding to tetraethylammonium tetrafluoroborate in propylene carbonate, a polarity electrode formed by carrying active carbon and a binder on a carbon paste, a separator, a sealing material and casings for positive and negative electrodes. In Table 4 are shown these test results.

TABLE 4

| | No. | Chemical composition (mass %) | | | | | | | | | | | | | |
|---|---|---|---|---|---|---|---|---|---|---|---|---|---|---|---|
| | | C | Si | Mn | P | S | Ni | Cr | Mo | Cu | Al | N | Ca | Mg | O |
| Invention material | 1 | 0.006 | 0.10 | 0.20 | 0.019 | 0.0006 | 24.19 | 23.00 | 5.54 | 0.09 | 0.008 | 0.193 | 0.0005 | 0.0002 | 0.0018 |
| | 2 | 0.007 | 0.05 | 0.10 | 0.012 | 0.0005 | 35.47 | 23.27 | 7.48 | 0.02 | 0.007 | 0.220 | 0.0002 | 0.0003 | 0.0028 |
| | 3 | 0.007 | 0.05 | 0.10 | 0.012 | 0.0005 | 35.47 | 23.27 | 7.48 | 0.02 | 0.007 | 0.220 | 0.0002 | 0.0003 | 0.0028 |
| | 4 | 0.007 | 0.05 | 0.10 | 0.012 | 0.0005 | 35.47 | 23.27 | 7.48 | 0.02 | 0.007 | 0.220 | 0.0002 | 0.0003 | 0.0028 |
| | 5 | 0.009 | 0.10 | 0.16 | 0.025 | 0.0004 | 34.94 | 23.05 | 7.53 | 0.26 | 0.010 | 0.219 | 0.0003 | 0.0007 | 0.0020 |
| Comparative material | 6 | 0.011 | 0.07 | 0.26 | 0.011 | 0.0007 | 34.79 | 23.24 | 7.44 | 0.01 | 0.020 | 0.208 | 0.0003 | 0.0012 | 0.0032 |
| | 7 | 0.011 | 0.08 | 0.08 | 0.014 | 0.0006 | 35.09 | 23.21 | 7.55 | 0.02 | 0.018 | 0.205 | 0.0022 | 0.0011 | 0.0019 |
| | 8* | 0.007 | 0.05 | 0.10 | 0.012 | 0.0005 | 35.47 | 23.27 | 7.48 | 0.02 | 0.007 | 0.220 | 0.0002 | 0.0003 | 0.0028 |
| | 9 | 0.009 | 0.35 | 0.19 | 0.026 | 0.0007 | 6.67 | 24.73 | 3.32 | 0.11 | 0.020 | 0.160 | 0.0003 | 0.0012 | 0.0032 |

| | No. | Chemical composition (mass %) | | | | | | Cr + 3.3 × Mo + 20 × N | Satisfy Mn: not more than 0.20 mass % and S: not more than 0.0010 mass % | Mass % of CaO in oxide inclusion in steel |
|---|---|---|---|---|---|---|---|---|---|---|
| | | W | Co | V | Nb | Ti | B | | | |
| Invention steel | 1 | 0.01 | 0.01 | — | — | — | 0.0020 | 45.1 | ○ | 1.4 |
| | 2 | 0.01 | 0.02 | — | — | — | 0.0009 | 52.4 | ○ | 0.1 |
| | 3 | 0.01 | 0.02 | — | — | — | 0.0009 | 52.4 | ○ | 0.1 |
| | 4 | 0.01 | 0.02 | — | — | — | 0.0009 | 52.4 | ○ | 0.1 |
| | 5 | 0.08 | 0.38 | 0.16 | 0.11 | 0.10 | 0.0021 | 52.3 | ○ | 0.7 |
| Comparative steel | 6 | 0.02 | 0.03 | — | — | — | 0.0006 | 53.0 | X | 2.2 |
| | 7 | 0.01 | 0.02 | — | — | — | 0.0027 | 52.2 | ○ | 43.9 |

-continued

| | Chemical composition (mass %) | | | | | | Cr + 3.3 × Mo + | Satisfy Mn: not more than 0.20 mass % and S: not more than | Mass % of CaO in oxide inclusion in |
|---|---|---|---|---|---|---|---|---|---|
| No. | W | Co | V | Nb | Ti | B | 20 × N | 0.0010 mass % | steel |
| 8* | 0.01 | 0.02 | — | — | — | 0.0009 | 52.3 | ○ | 0.1 |
| 9 | 0.12 | 0.04 | — | — | — | 0.0033 | 38.9 | ○ | 5.4 |

| | No. | Rolling reduction of second cold rolling | Vickers hardness | Result of pressing test on casing for positive electrode of coin type electric double-layer capacitor having a diameter of 6 mm | Experimental result by applying a voltage of 3.3 V to electric double-layer capacitor under enviroments of 60° C. and 95% humidity for 500 hours (surface state of casing for positive electrode) |
|---|---|---|---|---|---|
| Invention material | 1 | 0% | 210HV | ○ | ○ |
| | 2 | 0% | 213HV | ○ | ○ |
| | 3 | 15% | 308HV | ○ | ○ |
| | 4 | 20% | 353HV | ○ | ○ |
| | 5 | 0% | 227HV | ○ | ○ |
| Comparative material | 6 | 0% | 209HV | ○ | X (Occurrence of pitting corrosion) |
| | 7 | 0% | 221HV | ○ | X (Occurrence of pitting corrosion) |
| | 8* | 30% | 385HV | X (breakage by pressing) | — (Not conduct this experiment) |
| | 9 | 0% | 283HV | ○ | X (Occurrence of pitting corrosion) |

Chemical composition of 8* is within a range of the invention material.

As seen from the results of Table 4, the casing materials according to the invention enable the press working for shaping into a casing for positive electrode, and do not cause the corroded damage in the application of a voltage of 3.3 V for 500 hours imitating the charging environment, and have an excellent corrosion resistance as compared with the comparative steels. Also, it has been found that the casing materials according to the invention indicate the strength equal to or more than that of SUS329J4L stainless steel by subjecting to the second cold rolling at a light rolling reduction of 15-25% after the final annealing.

INDUSTRIAL APPLICABILITY

The invention is the casing material for positive electrode in a coin type storage cell such as an electric double-layer capacitor as a main use and is particularly applied to cells using a non-aqueous electrolyte and can be used as a material for a power application equipment, an electric car (fuel cell), a backup power source for electron equipments, a cell, a mobile power source or a power source for interruption of electric service.

The invention claimed is:

1. A casing material for a storage cell being made of an austenitic stainless steel comprising C: not more than 0.03 mass %, Si: 0.0 1-0.50 mass %, Mn: not more than 0.20 mass %, P: not more than 0.04 mass %, S: not more than 0.0005 mass %, Ni: 20.0-40.0 mass %, Cr: 20.0-30.0 mass %, Mo: 5.0-10.0 mass %, Al: 0.001-0.10 mass %, N: 0.10-0.50 mass %, Ca: not more than 0.001 mass %, Mg: 0.0001-0.0050 mass %, O: not more than 0.005 mass %, provided that contents of Cr, Mo and N satisfy a relation of the following equation (1), and the balance being substantially Fe and inevitable impurities, in which a content of CaO as an oxide inclusion in steel is not more than 20 mass %:

$$Cr+3.3\times Mo+20\times N \geq 43 \qquad (1)$$

(wherein each content of Cr, Mo and N is represented as mass %).

2. A casing material for a storage cell according to claim 1, which is a re-rolled material having a hardness of not less than 280 HV as a Vickers hardness by subjecting to a second cold rolling at a rolling reduction of 15-25% after a final annealing.

3. A casing material for a storage cell according to claim 2, which further contains one or more elements of Cu: 0.01-1.00 mass %, W: 0.01-1.00 mass %, Co: 0.01-1.00 mass %, V: 0.01-1.00 mass %, Nb: 0.01-1.00 mass %, Ti: 0.01-1.00 mass % and B: 0.0001-0.0 100 mass %.

4. A casing material for a storage cell according to claim 1, which further contains one or more elements of Cu: 0.01-1.00 mass %, W: 0.01-1.00 mass %, Co: 0.01-1.00 mass %, V: 0.01-1.00 mass %, Nb: 0.01-1.00 mass %, Ti: 0.01-1.00 mass % and B: 0.0001-0.0100 mass %.

* * * * *